(12) United States Patent
Hall

(10) Patent No.: US 7,370,429 B2
(45) Date of Patent: May 13, 2008

(54) INTEGRATED ELECTRONIC LEVEL DEVICE

(76) Inventor: Floyd E. Hall, 7262 Gull Point Rd., Franktown, VA (US) 23354-2307

( * ) Notice: Subject to any disclaimer, the term of this patent is extended or adjusted under 35 U.S.C. 154(b) by 0 days.

(21) Appl. No.: 11/468,046

(22) Filed: Aug. 29, 2006

(65) Prior Publication Data

US 2008/0052934 A1  Mar. 6, 2008

(51) Int. Cl.
*G01C 9/06* (2006.01)
(52) U.S. Cl. .................. 33/366.11; 33/366.15; 33/333
(58) Field of Classification Search .......... 33/366.11, 33/333, 334, 366.15, 366.18, 366.19, 366.21
See application file for complete search history.

(56) References Cited

U.S. PATENT DOCUMENTS

| | | | |
|---|---|---|---|
| 3,204,233 A * | 8/1965 | Olliff | 33/366.11 |
| 4,003,134 A | 1/1977 | Adams | |
| 4,079,521 A | 3/1978 | Uhorczak | |
| 4,110,609 A * | 8/1978 | Beer | 33/366.11 |
| 4,443,949 A | 4/1984 | Newton | |
| 4,506,450 A | 3/1985 | Fleming et al. | |
| 4,625,423 A | 12/1986 | Sackett | |
| 4,932,132 A * | 6/1990 | Baker et al. | 33/366.18 |
| 5,103,573 A | 4/1992 | Ehling et al. | |
| 5,625,955 A * | 5/1997 | Han | 33/366.15 |
| 5,740,881 A * | 4/1998 | Lensak | 33/366.11 |
| 5,848,489 A * | 12/1998 | Hartley et al. | 33/333 |
| 5,930,907 A * | 8/1999 | Ogawa et al. | 33/366.11 |
| 6,058,617 A | 5/2000 | Nadu | |
| 6,138,369 A * | 10/2000 | Mushin | 33/379 |
| 6,442,855 B2 * | 9/2002 | Takeuchi et al. | 33/366.19 |
| 6,688,013 B2 * | 2/2004 | Greway | 33/366.21 |
| 2002/0066199 A1 | 6/2002 | Hanson | |
| 2006/0054771 A1 | 3/2006 | Lie | |

* cited by examiner

*Primary Examiner*—Christopher W Fulton
(74) *Attorney, Agent, or Firm*—Alston & Bird LLP

(57) ABSTRACT

A device adapted to be integrated with a wall hanging for indicating an off-level condition is provided. The device includes a series electrical circuit including a power supply and a signal element connected with the power supply, wherein the signal element is capable of generating a perceptible output (such as a visible light or audible sound). The device also includes a level indicating switch connected between the signal element and electrical ground. The level indicating switch is capable of connecting the signal element with electrical ground only when the device is oriented at least at a selected acute angle relative to a substantially level condition such that the signal element generates the perceptible output only when the wall hanging is oriented in an off-level condition.

8 Claims, 3 Drawing Sheets

INTEGRATED ELECTRONIC LEVEL DEVICE

FIELD OF THE INVENTION

The various embodiments of the present invention relate generally to the field of leveling tools, and more specifically to electronic leveling devices adapted to be attached to wall hangings, such as picture frames.

BACKGROUND OF THE INVENTION

A number of leveling tools have been developed for determining an object's angular position relative to a substantially vertical and/or horizontal axis. For example, "bubble" or "spirit" levels have been used by carpenters for many years. More recent developments in this field have led to electronic light-indicating levels for indicating an object's angular position relative to a substantially vertical and/or horizontal axis. For example, some conventional "illuminated levels" include mercury switches configured to complete linear circuits including light emitting diodes and/or audio speakers such that the illuminated level emits a light and/or sound when the level is positioned either parallel to a vertical axis or parallel to a horizontal axis (indicating a level condition).

However, conventional illuminated or electronic levels are designed to be used as tools for use only during carpentry projects and/or other household projects (such as the hanging of framed artwork). Furthermore, such conventional illuminated or electronic leveling tools include many features (including, for example, multi-color LED lighting) for indicating a level condition by illuminating a first color LED and a number of different angular orientations using LED's of various colors that sequentially illuminate as the leveling tool is oriented in an off-level condition. The various features and settings present in such conventional tool-based leveling devices necessitates that such devices be relatively large and obtrusive. Furthermore, such conventional leveling devices are configured to emit a perceptible signal (such as the illumination of a red LED light) when the device is oriented in a level condition.

While some simple leveling devices have been integrated with picture-hanging hardware for indicating an off-level condition in a wall hanging, such conventional integrated levels utilize a "spirit level" configuration that must be viewed closely by a user to determine if the wall hanging is oriented at a selected acute angle relative to dead level.

Thus, there exists a need in the art for an electronic level device that is adapted to be unobtrusively integrated with a hanging picture frame or other wall hanging so as to provide a user with an easily-perceptible signal only when the wall hanging is "off level" or oriented at a selected acute angle relative to a substantially horizontal axis. There further exists a need in the art for an electronic level device that does not emit a perceptible signal when oriented in a substantially level position such that the device goes unnoticed until it detects a substantially "off-level" orientation.

BRIEF SUMMARY OF THE INVENTION

The embodiments of the present invention satisfy the needs listed above and provide other advantages as described below. Embodiments of the present invention include a device for indicating an off-level condition, wherein the device is adapted to be operably engaged with a wall hanging. The device comprises a power supply and a signal element operably engaged with the power supply, wherein the signal element is configured to be capable of generating a perceptible output. According to various embodiments, the power supply may include, but is not limited to: a battery; a solar cell; a capacitive power supply; and combinations of such power supply elements. Furthermore, in some embodiments, the signal element may include, but is not limited to: a resistive lighting element; a light emitting diode; a speaker; and combinations of such signal elements.

The device further comprises a level indicating switch operably engaged between the signal element and electrical ground. The level indicating switch is configured to connect the signal element with electrical ground only when the level indicating switch is oriented at least at a selected acute angle relative to a substantially horizontal axis. Thus, the signal element generates the perceptible output only when the wall hanging is oriented at least at the selected acute angle relative to the substantially horizontal axis.

In some embodiments, the device further comprises a switch device operably engaged between the level indicating switch and electrical ground. Furthermore, the switch device is configured to selectively disconnect the level indicating switch from electrical ground in response to a user input. Thus, a user may choose to turn off the device such that the perceptible output is not generated even when the level indicating switch is oriented at least at the selected acute angle relative to the substantially horizontal axis.

In some embodiments, the level indicating switch comprises a reservoir and a conductive liquid disposed within the reservoir. According to various embodiments, the conductive liquid may include, but is not limited to: mercury; a conductive electrolyte; and combinations of such conductive liquids. According to some such embodiments, the level indicating switch further comprises a first electrical contact operably engaged with the signal element and extending through a wall defining the reservoir. The first electrical contact is oriented within the reservoir such that the first electrical contact is submerged in the conductive liquid. The level indicating switch further comprises a second electrical contact operably engaged with electrical ground and extending through the wall defining the reservoir. The second electrical contact is oriented within the reservoir such that the second electrical contact is submerged in the conductive liquid only when the reservoir is oriented at least at the selected acute angle relative to the substantially horizontal axis in a first direction. The level indicating switch further comprises a third electrical contact operably engaged with electrical ground and extending through the wall defining the reservoir. The third electrical contact is oriented within the reservoir such that the third electrical contact is submerged in the conductive liquid only when the reservoir is oriented at least at the selected acute angle relative to the substantially horizontal axis in a second direction.

Thus the various embodiments of the device of the present invention provide many advantages that may include, but are not limited to: providing a small, unobtrusive electronic level device adapted to be integrated with a wall hanging; providing an integrated electronic leveling device that produces a perceptible output only when the wall hanging requires adjustment to return it to a substantially level condition; and providing an integrated level device that produces an easily-perceptible output to a user from a substantially long distance.

These advantages, and others that will be evident to those skilled in the art, are provided in the system, method, and computer program product of the present invention.

BRIEF DESCRIPTION OF THE SEVERAL VIEWS OF THE DRAWINGS

Figure 1:
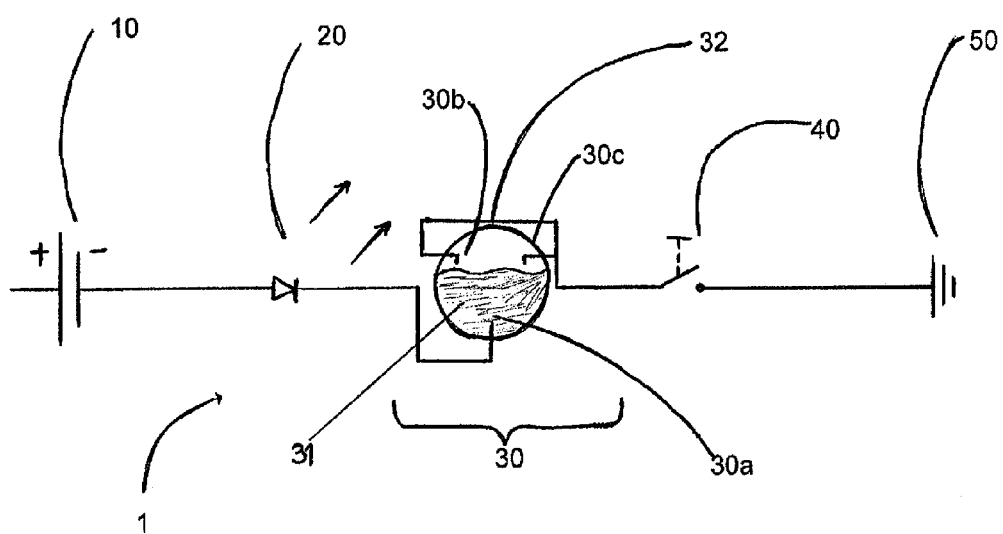

Having thus described the invention in general terms, reference will now be made to the accompanying drawings, which are not necessarily drawn to scale, and wherein:

FIG. 1 is a schematic illustration of a device for indicating an off-level condition, according to one embodiment of the present invention.

Figure 2A:
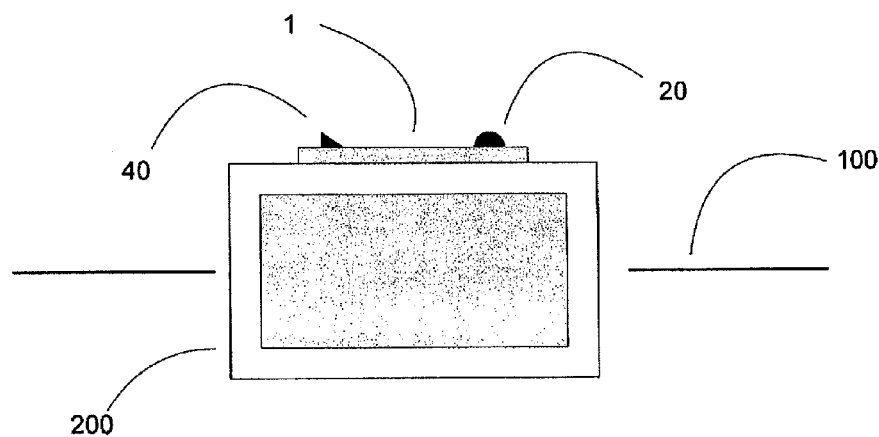

FIG. 2A is a schematic illustration of a device, according to one embodiment of the present invention, wherein the device is operably engaged with a wall hanging, and wherein the wall hanging is oriented substantially orthogonally to a horizontal axis.

Figure 2B:
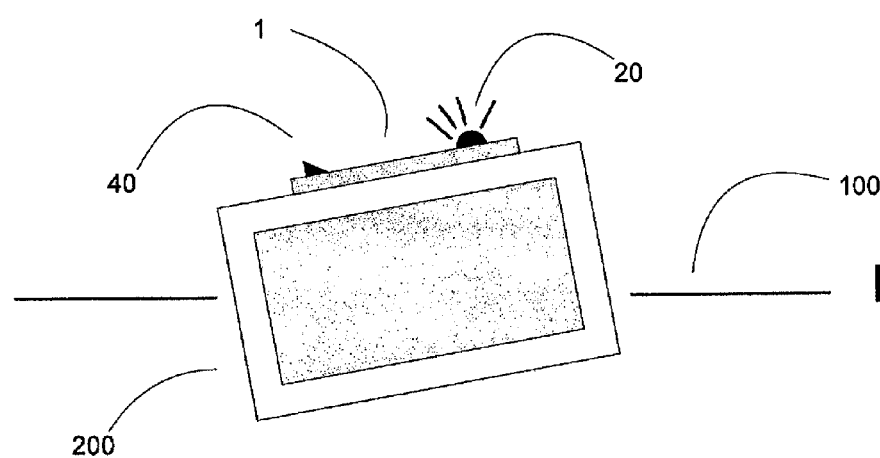

FIG. 2B is a schematic illustration of a device, according to one embodiment of the present invention, wherein the device is operably engaged with a wall hanging, and wherein the wall hanging is oriented at a selected acute angle relative to a horizontal axis in a first direction.

Figure 2C:
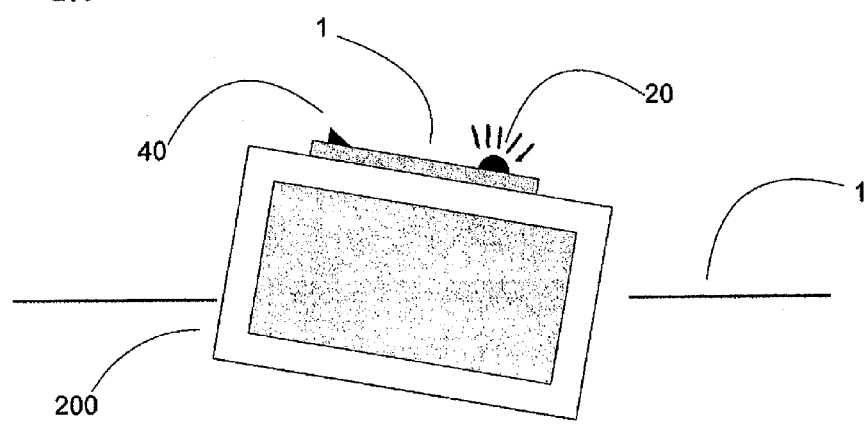

FIG. 2C is a schematic illustration of a device, according to one embodiment of the present invention, wherein the device is operably engaged with a wall hanging, and wherein the wall hanging is oriented at a selected acute angle relative to a horizontal axis in a second direction.

Figure 3A:
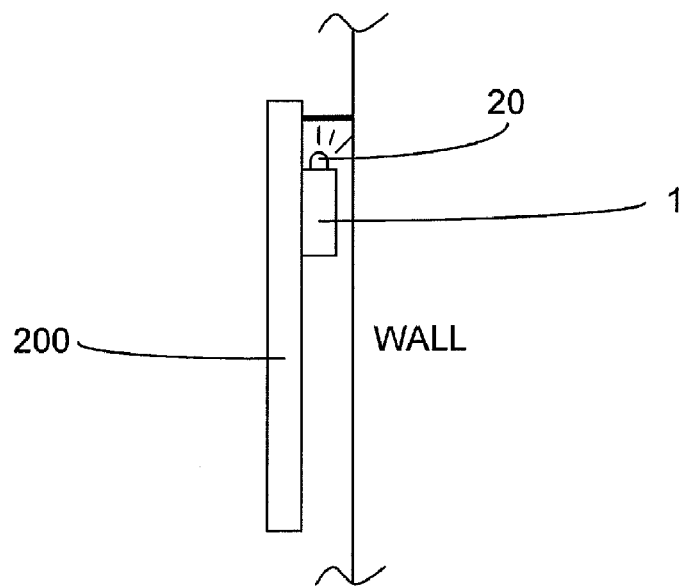

FIG. 3A is a side view schematic illustration of a device, according to one embodiment of the present invention, wherein the device is operably engaged with a rearward side of the wall hanging so as to be concealed, and wherein the wall hanging is oriented at a selected.

Figure 3B:
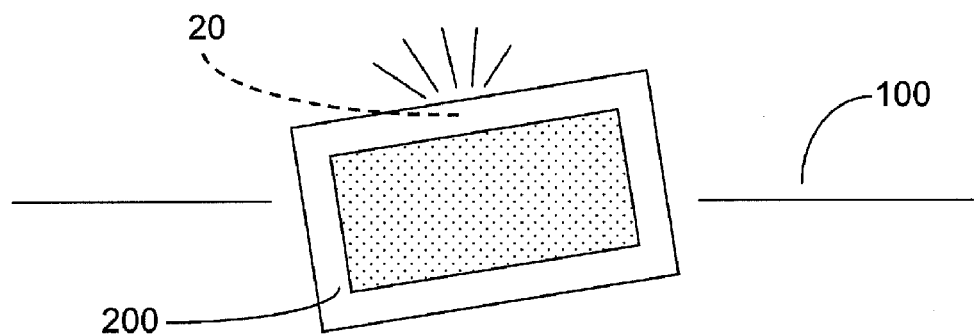

FIG. 3B is a schematic illustration of a device, according to one embodiment of the present invention, wherein the device is operably engaged with a rearward side of the wall hanging so as to be concealed, and wherein the wall hanging is oriented at a selected acute angle relative to a horizontal axis such that a signal is visible from a forward side of the wall hanging.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a device 1 for indicating an off-level condition, according to one embodiment of the present invention. As shown in FIG. 2A, for example, the device 1 is adapted to be operably engaged with a wall hanging 200 so as to be capable of orienting the wall hanging 200 relative to a substantially horizontal axis 100. As shown in FIG. 1, the device 1 comprises a power supply 10 and a signal element 20 operably engaged with the power supply 10. For example, the signal element 20 may be in a serial electrical connection between the power supply 10 and electrical ground 50 such that the signal element 20 is configured to be capable of generating a perceptible output (such as, for example, a visible light and/or an audible sound) when the circuit between the power supply 10 and electrical ground 50 is completed. Thus, the device 1 may be configured to emit a perceptible audible and/or visible signal only when the wall hanging 200 is oriented off-level (at least at a selected acute angle relative to the substantially horizontal axis 100, for example). In addition, the device 1 may be further configured to cease emission of the perceptible signal when the wall hanging 200 is oriented substantially level relative to the substantially horizontal axis 100 such that the device remains relatively unobtrusive and/or imperceptible when the wall hanging 200 is oriented substantially level relative (and/or parallel) to the substantially horizontal axis 100.

While the signal element 20 shown generally in FIGS. 1, 2A, 2B and 2C is depicted as a light emitting diode (LED), it should be understood that the signal element 20 may comprise a variety of different electronic components capable of producing a perceptible output. For example, the signal element 20 may include, but is not limited to: a resistive lighting element; an LED; a speaker; and combinations of such electrically powered signal elements 20. As shown generally in FIG. 2B, the signal element 20 may be positioned relative to the device 1 housing and the wall hanging 200 with which it may be operably engaged, such that the signal element 20 is visible (in embodiments utilizing light-emitting signal elements 20) and/or audible (in embodiments utilizing sound-emitting signal elements 20) to a user. Furthermore, while FIGS. 2A-2C depict embodiments of the device 1 operably engaged with a top portion of a wall hanging 200 (such as a frame), it should be understood that the device 1 may be operably engaged with the wall hanging 200 in a number of different positions and/or configurations. For example, in some embodiments, the device 1 may be affixed to a side of the wall hanging 200 facing a wall to which the wall hanging 200 is attached. According to such embodiments, the device 1 may be configured such that the signal element 20 is not immediately visible and/or otherwise perceptible to a viewer until the wall hanging 200 is tilted to at least the selected acute angle (off-level) relative to the substantially horizontal axis 100. For example, in such embodiments (and wherein the signal element 20 comprises an LED or other light-emitting element, for example), the signal element 20 may be configured to illuminate a portion of a wall with a "halo" of diffuse light from a position behind the wall hanging 200 in order to subtly indicate to a user that the wall hanging 200 is positioned in an "off-level" orientation.

Furthermore, the power supply 10 shown generally in FIG. 1 may comprise a number of different electrical power supplies and/or voltage sources that may include, but are not limited to: a battery; a capacitive power supply; and combinations of such power supplies. Furthermore, in some device 1 embodiments, the power supply 10 may comprise a solar cell in lieu of and/or in addition to a battery or other power supply 10 such that the device 10 may operate effectively even if a battery or other power supply is inoperable or is otherwise not available.

Referring again to FIG. 1, the device 1 further comprises a level indicating switch 30 operably engaged between the signal element 20 and electrical ground 50. The level indicating switch 30 is configured to connect the signal element 20 with electrical ground 50 (thereby activating the perceptible output) only when the level indicating switch 30 is oriented at a selected acute angle relative to a substantially horizontal axis 100 (see, for example, FIG. 2B). Thus, the signal element 20 generates the perceptible output only when the wall hanging 200 is oriented at least at the selected acute angle relative to the substantially horizontal axis 100 such that the device 1 remains relatively unobtrusive when the wall hanging 200 is oriented substantially parallel to the substantially horizontal axis 100 (as shown generally in FIG. 2A).

As shown in FIG. 1, the level indicating switch 30 may comprise a reservoir 32 and a conductive liquid 31 disposed within the reservoir 32. The conductive liquid 31 may comprise various types of electrolytes and/or substantially conductive liquid metals that may include, but are not limited to: mercury; conductive electrolytes; and combinations of such conductive liquids 31. Furthermore, the level indicating switch 30 shown generally in FIG. 1 further comprises a first electrical contact 30a operably engaged with the signal element 20 and extending through a wall defining the reservoir 32. As shown in FIG. 1, the first electrical contact 30a is oriented within the reservoir 32 such that the first electrical contact 30a is submerged in the conductive liquid 31 (even while the wall hanging 200 is substantially parallel to the substantially horizontal axis 100 (see FIG. 2A).

The level indicating switch 30 further comprises additional electrical contacts 30b, 30c that may be oriented relative to the reservoir 32 such that the electrical contacts 30b, 30c are suspended out of contact with the conductive liquid 31 while the wall hanging 200 is substantially parallel to the substantially horizontal axis 100 (see FIG. 2A). For example, as shown in FIG. 1, the level indicating switch 30 comprises a second electrical contact 30b operably engaged with electrical ground 50 and extending through the wall defining the reservoir 32. As described herein, the second electrical contact 30b is being oriented within the reservoir 32 such that the second electrical contact 30b is submerged in the conductive liquid 31 only when the reservoir 32 is oriented at least at the selected acute angle relative to the substantially horizontal axis 100 in a first direction (see, for example, FIG. 2B, showing the wall hanging 200 (and the device 1 operably engaged therewith) tilted to the left relative to dead level). Furthermore, the level indicating switch 30 comprises a third electrical contact 30c operably engaged with electrical ground 50 and extending through the wall defining the reservoir 32. As shown in FIG. 1, the third electrical contact 30c is oriented within the reservoir 32 such that the third electrical contact 32 is submerged in the conductive liquid 31 only when the reservoir 32 is oriented at least at the selected acute angle relative to the substantially horizontal axis 100 in a second direction (see, for example, FIG. 2C, showing the wall hanging 200 (and the device 1 operably engaged therewith) tilted to the right relative to dead level).

Thus, the operation of the level indicating switch 30 (and the orientations of the various electrical contacts 30a, 30b, 30c included therein) may ensure that the series electrical circuit connecting the power supply 10, the signal element 20, and electrical ground 50 is completed (resulting in the generation of a perceptible output by the signal device 20) only when the level indicating switch 30 (and the wall hanging 200 with which it is adapted to be operably engaged) is tilted (at a selected angle) relative to dead level (as designated, for example, by the substantially horizontal axis 100 shown in FIGS. 2A-2C). Thus, as described herein, the device 1 embodiments of the present invention may be operably engaged with a wall hanging 200 so as to have a substantially low profile relative to a frame or other peripheral component of a wall hanging such that the device 1 is not easily perceptible or noticed until such time as the signal device 20 is activated by an off-level condition (see FIGS. 2B-2C, for example).

Furthermore, it should be understood that the selected acute angle of orientation (relative to the substantially horizontal axis 100) required to complete the series circuit of the device 1 (see FIG. 1) via the level indicating switch 30 may be adjusted in a number of ways. For example, the volume of conductive liquid 31 may be added to or removed from the reservoir 32 such that smaller or larger "tilt" angles are required to complete the conductive pathway between the first electrical contact 30a and one or more of the second and third electrical contacts 30b, 30c. Furthermore, the orientations of the second and third electrical contacts 30b, 30c may be adjusted relative to a wall defining the reservoir 32 such that smaller or larger selected "tilt" angles are required to complete the conductive pathway between the first electrical contact 30a and one or more of the second and third electrical contacts 30b, 30c.

In addition, in some device 1 embodiments of the present invention, as shown generally in FIG. 1, the device 1 further comprises a switch device 40 operably engaged between the level indicating switch 30 and electrical ground 50. The switch device 40 may comprise one or more types of manual "push button" or throw switches that may be actuated by a user to selectively disconnect the level indicating switch 30 from electrical ground 50 such that the device 1 may be manually deactivated by a user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wall hanging capable of indicating an off-level condition, the wall hanging comprising:
 a frame member having a forward side and an opposing rearward side, the rearward side being adapted to be disposed adjacent a wall supporting the wall hanging mounted thereon; and
 an off-level indicating device operably engaged with the frame member, the off-level indicating device comprising:
  a level indicating switch configured to generate an off-level signal only when the level indicating switch is oriented at an acute angle relative to a horizontal axis; and
  a signal element in communication with the level indicating switch and configured to be capable of receiving the off-level signal therefrom and generating a perceptible visible output in response to the off-level signal, at least one of the signal element and the level indicating switch being operably engaged with the rearward side of the frame member so as to be concealed with respect to the forward side of the frame member.

2. A wall hanging according to claim 1, further comprising a power supply operably engaged with the signal element, and wherein the level indicating switch is operably engaged between the signal element and electrical ground, the level indicating switch being further configured to provide electrical power to the signal element by connecting the signal element to electrical ground only when the level indicating switch is oriented at least at the selected acute angle relative to the substantially horizontal axis.

3. A wall hanging according to claim 2, wherein the level indicating switch comprises:
 a reservoir;

a conductive liquid disposed within the reservoir;

a first electrical contact operably engaged with the signal element and extending through a wall defining the reservoir, the first electrical contact being oriented within the reservoir such that the first electrical contact is submerged in the conductive liquid;

a second electrical contact operably engaged with electrical ground and extending through the wall defining the reservoir, the second electrical contact being oriented within the reservoir such that the second electrical contact is submerged in the conductive liquid only when the reservoir is oriented at least at the selected acute angle relative to the substantially horizontal axis in a first direction; and a third electrical contact operably engaged with electrical ground and extending through the wall defining the reservoir, the third electrical contact being oriented within the reservoir such that the third electrical contact is submerged in the conductive liquid only when the reservoir is oriented at least at the selected acute angle relative to the substantially horizontal axis in a second direction.

4. A wall hanging according to claim 2, wherein the conductive liquid is selected from the group consisting of:

mercury;

conductive electrolyte; and combinations thereof.

5. A wall hanging according to claim 2, wherein the power supply is selected from the group consisting of:

a battery;

a solar cell;

a capacitive power supply; and combinations thereof.

6. A wall hanging according to claim 1, further comprising a switch device operably engaged between the level indicating switch and electrical ground, the switch device being configured to selectively disconnect the level indicating switch from electrical ground.

7. A wall hanging according to claim 1, wherein the signal element is selected from the group consisting of:

a resistive lighting element;

a light emitting diode;

a speaker; and combinations thereof.

8. A wall hanging according to claim 1, wherein the signal element is operably engaged with the rearward side of the frame member so as to be concealed with respect to the forward side of the frame member, and the signal element is further configured such that the perceptible visible output generated thereby in response to the off-level signal is visible from the forward side of the frame member via reflection off the wall supporting the wall hanging.

* * * * *

UNITED STATES PATENT AND TRADEMARK OFFICE
CERTIFICATE OF CORRECTION

| | |
|---|---|
| PATENT NO. | : 7,370,429 B2 |
| APPLICATION NO. | : 11/468046 |
| DATED | : May 13, 2008 |
| INVENTOR(S) | : Floyd E. Hall |

It is certified that error appears in the above-identified patent and that said Letters Patent is hereby corrected as shown below:

Column 3:

Line 28: "concealed, and wherein the wall hanging is oriented at a selected."

should read --concealed.--

Signed and Sealed this

Second Day of September, 2008

JON W. DUDAS
*Director of the United States Patent and Trademark Office*